(12) United States Patent
Mathews, III et al.

(10) Patent No.: US 7,617,977 B2
(45) Date of Patent: Nov. 17, 2009

(54) TICKETING SYSTEM FOR PERSONAL RAPID TRANSIT

(75) Inventors: Donald H. Mathews, III, Minneapolis, MN (US); Jeral G. Poskey, Minneapolis, MN (US)

(73) Assignee: Taxi 2000 Corporation, Fridley, MN (US)

( * ) Notice: Subject to any disclaimer, the term of this patent is extended or adjusted under 35 U.S.C. 154(b) by 267 days.

(21) Appl. No.: 11/452,184

(22) Filed: Jun. 13, 2006

(65) Prior Publication Data

US 2007/0288307 A1   Dec. 13, 2007

(51) Int. Cl.
G07B 15/02 (2006.01)

(52) U.S. Cl. .......................... 235/384; 705/13

(58) Field of Classification Search ................ 235/375, 235/380, 382, 384; 705/13; 340/988–996; 701/1–302
See application file for complete search history.

(56) References Cited

U.S. PATENT DOCUMENTS

| | | | |
|---|---|---|---|
| 3,610,159 A * | 10/1971 | Fickenscher | 104/88.05 |
| 4,058,217 A * | 11/1977 | Vaughan et al. | 209/559 |
| 4,247,759 A | 1/1981 | Yuris et al. | |
| 5,168,451 A * | 12/1992 | Bolger | 701/117 |
| 6,721,654 B2 * | 4/2004 | Akiyama | 701/209 |
| 2006/0206261 A1 * | 9/2006 | Altaf et al. | 701/209 |

OTHER PUBLICATIONS

Anderson, J. Edward, Ph.D.; "The Design, Operation and Benefits of SkyWeb Express"; Apr. 18, 2004; pp. 1-23; By Taxi 200 Corp.
Anderson, J. Edward, Ph.D.; "Essentials of Personal Rapid Transit"; Infrastructure, vol. 2 No. 3; 1997; pp. 8-17; John Wiley & Sons, Inc.
Anderson, J. Edward, Ph.D.; "A Review of the State of the Art of Personal Rapid Transit"; Journal of Advanced Transportation, vol. 3 No. 1; Feb. 2000; pp. 3-29.
Daly, Richard F., Komerska, Richard J. and Anspach, Gretel, "Station Capacity: An Issue in PRT System Planning", Presented at the Sixth International Conference on Automated People Mover Systems (APM VI), 1997, pp. 1-10.

* cited by examiner

*Primary Examiner*—Jamara A Franklin
(74) *Attorney, Agent, or Firm*—Sherrill Law Offices, PLLC

(57) ABSTRACT

A ticketing system for a transportation network comprising (a) at least one ticket having trip data that includes at least one destination within a transportation network, (b) a vehicle for transporting an item along the transportation network, and (c) a ticket reader configured and arranged to electronically read trip data on the ticket and assign a vehicle to travel along the transportation network in accordance with the trip data.

20 Claims, 9 Drawing Sheets

TICKETING SYSTEM FOR PERSONAL RAPID TRANSIT

FIELD OF INVENTION

The present invention generally relates to a ticketing system. More specifically, it can relate to a method and apparatus for charging fares for rides on a vehicle in a transportation network such as a Personal Rapid Transit (PRT) System.

BACKGROUND OF THE INVENTION

Ticketing systems for mass transit and other transportation networks have long been known in the art. Ticketing systems for PRT are less well established.

There are many ways that a rider can pay to ride in a transit network. In years past, a rider paid with cash and bought a ticket or a token from a person staffing a booth. More recently, riders have bought tickets from machines using cash. Today, a rider can buy a fare using cash, debit cards, credit cards, electronic accounts, and so forth. In addition, the fare can be purchased in many different ways such as by using a machine at a station or other location, on the telephone, on the Internet, and so forth.

Most modern ticketing systems have little human involvement. In many cases, the only human involvement in the transaction is by the fare purchaser.

The prior art for ticketing systems suffers from certain shortcomings or limitations. The purpose of the present invention is to overcome these and other shortcomings or limitations in the prior art.

SUMMARY OF THE INVENTION

The present invention generally relates to a ticketing system. More specifically, it can relate to a method and apparatus for dispensing and collecting tickets for rides on a vehicle in a transportation network such as a Personal Rapid Transit (PRT) System.

In at least a second embodiment, the ticketing system can be part of a control system for a transportation network. The ticketing system can comprise a reusable payment card that can be used for more than one trip on the network. The reusable payment card can be encoded with account data. A ticket (and card) reader can read the account data on the reusable payment card and can allow the holder of the reusable payment card to enter trip data into the reader. The trip data can describe a trip to one or more destinations in the transportation network. The account data can be used by the ticketing system to bill the account of the card holder. A control system can retrieve the trip data from the ticket reader, can associate a vehicle with the destination, and can issue commands to the vehicle to proceed to the destination when commanded.

In at least a third embodiment, the ticketing system can be part of a control system for a transportation network. The ticketing system can comprise a ticket encoded with account data and trip data that identifies at least one destination in a transportation system. A ticket reader can read the account data on the ticket and can read the trip data. The trip data can describe a trip to one or more destinations in the transportation network. The account data can be used by the ticketing system to bill the account of the ticket issuer. A control system can retrieve the trip data from the ticket reader, can associate a vehicle with the destination, and can issue commands to the vehicle to proceed to the destination when commanded.

In at least a fourth embodiment, the ticketing system can be part of a control system for a transportation network. The ticketing system can comprise a ticket machine and reader combined in one physical unit at a station. The combined unit can allow a passenger to purchase a virtual ticket that comprises trip data with at least one destination. A control system can retrieve the trip data from the ticket reader, can associate a vehicle with the destination, and can issue commands to the vehicle to proceed to the destination when commanded.

Briefly, one aspect of the invention is a ticketing system for a transportation network comprising (a) at least one ticket having trip data that includes at least one destination within a transportation network, (b) a vehicle for transporting an item along the transportation network, and (c) a ticket reader configured and arranged to electronically read trip data on the ticket and assign a vehicle to travel along the transportation network in accordance with the trip data.

Briefly, a second aspect of the invention is a ticketing system for a transportation network comprising (a) at least one payment card having account data, (b) a vehicle for transporting an item along a transportation network, and (c) a check-in system configured and arranged to electronically (i) read account data from the payment card, (ii) interface with a human to receive trip data that includes at least one destination within the transportation: network, (iii) assign a vehicle to travel along the transportation network in accordance with the trip data, and (iii) charge the account for the trip.

Briefly, a third aspect of the invention is a ticketing system for a transportation network comprising (a) at least one ticket having (i) trip data that includes at least one destination within a transportation network, and (ii) account data, (b) a vehicle for transporting an item along the transportation network, and (c) a ticket reader configured and arranged to electronically read trip data on the ticket, assign a vehicle to travel along the transportation network in accordance with the trip data, and charge the account for the trip.

The above summary of the present invention is not intended to describe each illustrated embodiment, object, advantage, or use of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE INVENTION

Figure 1A:
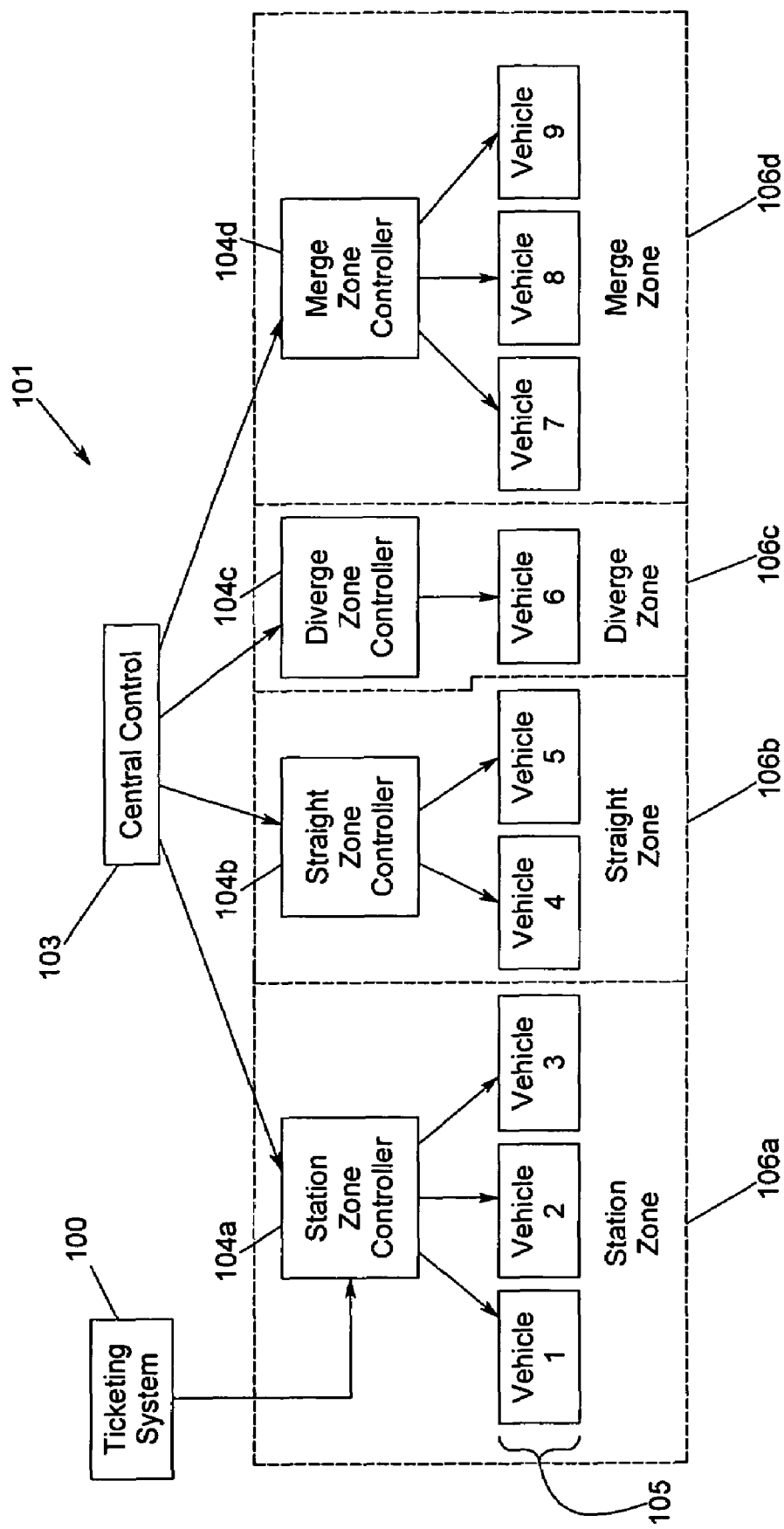
FIG. 1A is a block diagram showing a control system with selected zone controllers and vehicles for a personal rapid transit network according to a first embodiment.

Nomenclature
100 ticketing system
101 control system
102 PRT network
103 central control
104a station zone controller
104b straight zone controller
104c diverge zone controller
104d merge zone controller
105 vehicle control
106a station zone
106b straight zone
106c diverge zone
106d merge zone
107 vehicle berth
107a berth 1
107b berth 2
107c berth 3
108 destination ticket
109 ticket machine
110 destination ticket option
111 map
112 trip data
113 ticket reader
114 gate
200 ticketing system with reusable payment card
204a station zone controller
208 reusable payment card
209 ticket machine
212 trip data
213 ticket reader
215 "payment card" button
216 account data
217 "reload balance" button
220 passenger keypad input
225 billing within the ticketing system
300 ticketing system with pre-coded destination ticket
304a station zone controller
308 pre-coded destination ticket
312 trip data
313 ticket reader
316 account data
325 billing within the ticketing system As disclosed, the invention concerns a ticketing system for a transportation network. One application in which the ticketing system might preferably be used is for a PRT network. The ticketing system can be also used with other forms of transportation including air-, water-, land-, and space-based transportation. The transportation can occur in structures such as an elevator shaft or in the open air such as with railcars. Moreover, the transportation objectives might include transporting passengers, freight, and many other things. However, the invention is not limited to ticketing systems for transportation. The method and apparatus may be useful for other purposes. Other purposes might include various applications in which a fare needs to be paid for or collected or in which trips in a transportation network have to be coordinated.

Terminology

As discussed here, the following terms can have the following meanings. The phrase "ticketing system" means the system by which a passenger gains authorized access for the use of a transportation system. Generally, such a system can incorporate hardware and software. The ticketing system can include the payment of a fare and the means by which a fare is paid. However, in certain situations the ticketing network may not be set up to collect a fare. The ticketing system can also mean that part of the transportation network by which a passenger can input data into the control system that operates the transportation network. The ticketing system can provide the control system with trip related data such as the desired destination or destinations. It can also include payment and other forms of data.

The term "ticket" means data, generally entered by a passenger, describing or associated with a trip or trips within a transportation network. A ticket can be represented by a physical item such as a paper ticket or a token that retains data. It can also be a "virtual ticket" that signifies a grouping of data describing or associated with a trip or trips in a transportation network.

This is not a complete listing of all the terms used here. Other terms and definitions are discussed below.

Applications in Transportation—Personal Rapid Transit

As mentioned, one application for ticketing system can be transportation. Transportation networks can range from those that transport one individual in a vehicle (such as an automobile) to those that transport thousands in a vehicle (an ocean liner).

Personal Rapid Transit (PRT) systems can be one form of transportation in which fares need to be paid and collected. PRT systems have been known in the art for a number of years. For example, U.S. Pat. No. 4,522,128 to Anderson; U.S. Pat. No. 4,665,829 to Anderson et al.; U.S. Pat. No. 4,665,830 to Anderson; U.S. Pat. No. 4,671,185 to Anderson; and U.S. Pat. No. 4,726,299 to Anderson teach, among other things, a PRT system with vehicles sized for small numbers of passengers that can move along a guideway that is part of a network of guideways.

Under normal operating conditions for a PRT system, a computerized control system controls the operation of the vehicles on the guideway. The computerized control systems for PRT can be extremely complex. A PRT network such as described in U.S. Pat. No. 4,726,299 to Anderson can require comprehensive control of the vehicles within the PRT network. The control system can be capable of controlling the movement of large numbers of vehicles from origin to destination. However, the method of operation should preferably be sufficiently flexible to allow the control system to direct any vehicle to any possible destination station from any possible departure station. Moreover, the control system should preferably undertake all its tasks in a safe and efficient manner.

The ticketing system of the invention can be part of a control system for a PRT network. As discussed below, it can also provide data such as departure and destination stations to the control system. It can perform other tasks, some of which are mentioned below.

FIRST EMBODIMENT

Figure 1B:
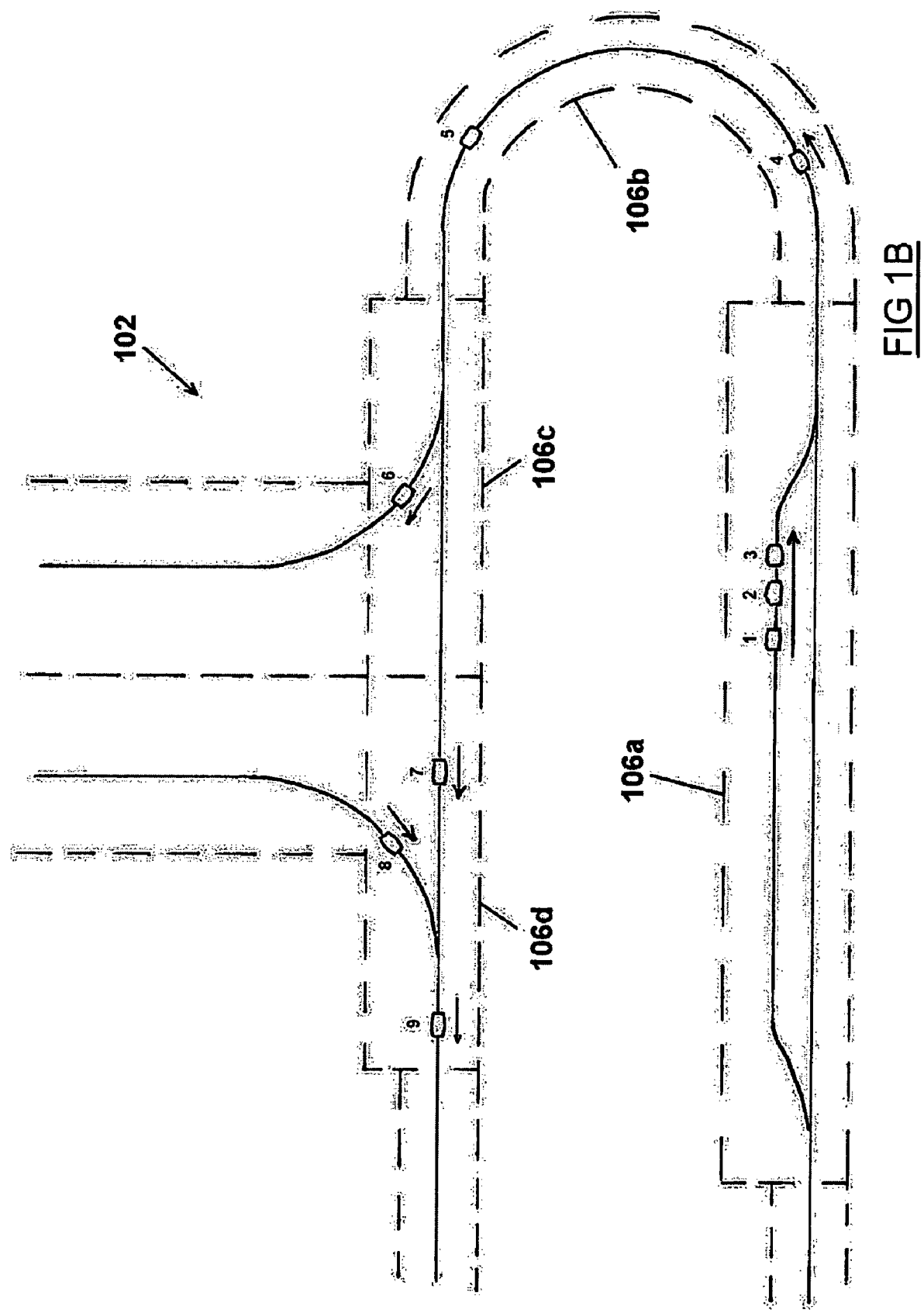
FIG. 1B is a plan view of a portion of a guideway for a personal rapid transit network according to a first embodiment.

A ticketing system 100 for PRT can take various forms. FIGS. 1A to 1F show a ticketing system 100 according to a first embodiment. That ticketing system 100 can function as part of a larger PRT control system 101 discussed above. The PRT's control system 101 can control the movement of vehicles 1 to 9 in a network 102 (a portion of which is shown in FIG. 1B). As shown in FIG. 1A, the control system 101 can have three levels: central control 103, zone controller 104a, 104b, 104c and 104d, and vehicle control 105 (although more or fewer levels can also be appropriate for certain applications). In the applications described here, the central control 103 can issue commands to and receive data from the zone controllers 104 as shown in FIG. 1A. Each zone controller 104 can control a particular zone 106a, 106b, 106c or 106d in the network 102. Each zone controller 104a to 104d can have exclusive control for the zones 106a to 106d assigned to them.

For instance, when vehicle 1 is in the station zone 106a as shown in FIG. 1B, the station zone controller 104a can preferably have exclusive control of vehicle 1. The straight zone controller 104b can preferably have exclusive control of vehicle 4 because vehicle 4 is in the straight zone 106b. And, if vehicle 1 passes from the station zone 106a into the straight zone 106b, communication with vehicle 1 passes from the station zone controller 104a to the straight zone controller 104b.

There can be any number of additional zones (not shown), multiples of the same kinds of zones (not shown), zone controllers (not shown), and kinds of zone controllers (not shown) in a PRT network 102. In addition, there can be large numbers of vehicles on the network, and each zone can handle multiple vehicles (not shown).

Figure 1C:
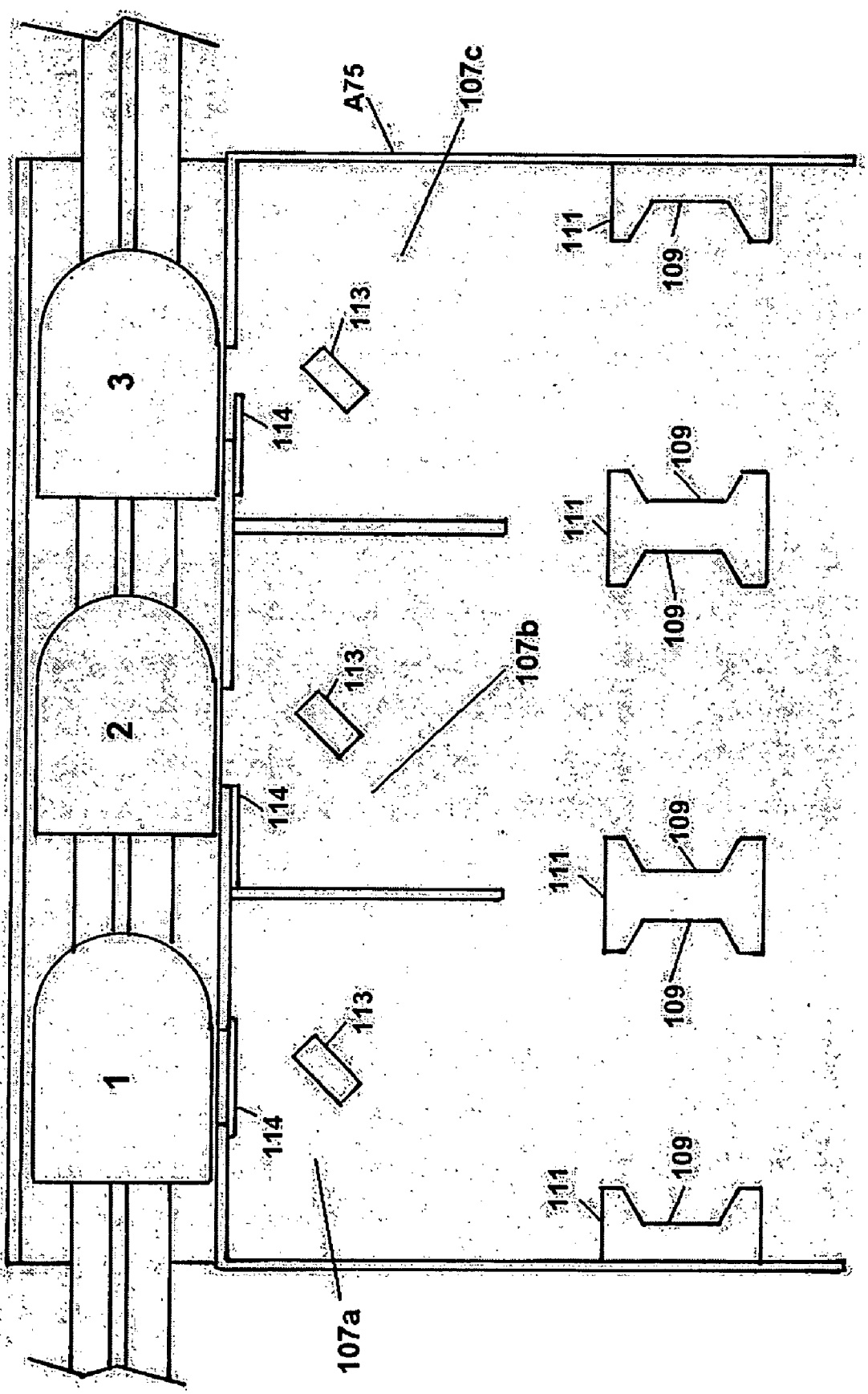
FIG. 1C is a plan view of a station with berths for a personal rapid transit network according to a first embodiment.

The station zone 106a can be the area (in the physical sense) in which passengers (not shown) load and unload. FIG. 1C is a view of a portion of the station zone 106a in which the vehicle berths 107a, 107b and 107c can be located. For loading and unloading, a PRT vehicle 1 to 3 can be parked at each berth 107a to 107c. The station zone 106a can preferably have from three to twelve berths, although more or fewer can configured. The number of berths can be based on expected usage. Busier stations can have more berths. Less busy stations can have fewer berths.

For a PRT network, the station zone 106a can also be the point in the network 102 at which passengers (not shown) can pay for or have their fares collected. Therefore, it can be preferable to have the station controller 104a communicate both with the central control 103 and with the ticketing system 100 as shown in FIG. 1A. The ticketing system 100 can also be configured to communicate with the central control 103 for backup.

Although, as stated here, the ticketing system 100 can be set up to communicate with the station controller 104a, this does not have to be the case. In other embodiments (not shown here) the ticketing system 100 could communicate with other parts of the control system 101. The ticketing system 100 could communicate directly with the central control 103. The ticketing system 100 could communicate with different zone controllers 104a to 104d for different kinds of transactions. Such other set-ups are still within the scope of the invention.

A typical transaction for obtaining a standard "destination ticket" 108 (including both one-way and round-trip tickets) can work as follows. A destination ticket 108 can be purchased through a ticket machine 109. The ticket machine 109 can be located at a station such as A75, as shown, for example, in FIGS. 1C and 1D. The ticket machine 109 can be located at other places, too. It can be located at many different locations convenient to passengers including office buildings, shopping malls, etc. (not shown). In addition, the ticket machine 109 can be web-based allowing a passenger to purchase tickets 108 online (not shown).

At or near the ticket machine 109, the passenger can have access to a map 111 of the PRT network 102 and a directory listing stations (not shown) within the PRT network 102. The map 111 can be a layout of the transportation network 102 similar to the one shown in FIG. 1D. The map 111 can be overlaid on a street map (not shown). Each station, see FIG. 1D, can have a unique station code which can be identified by alphanumeric symbols. The alphanumeric symbols can be assigned to stations based on a system convenient for organizing the network and for the passengers using the PRT. In FIG. B, for example, the station can be the one at which a passenger is purchasing a ticket. It can be identified as station "A75" on the map shown in FIG. 1D. The station to which the passenger wishes to travel can be identified as station "W5".

The ticket machine 109 can have a user interface (not shown) that allows the passenger to select the "destination ticket" option 110 from the pick-list, and then enter the destination station, i.e., W5 in this example, into the ticketing system 100. (If the passenger is buying a ticket 108 at a location other than the departure station A75, the passenger can be required to identify the departure station, too.) Keypad, touch-screen, voice-activation interfaces (not shown) represent some of the ways in which the destination station can be entered.

Once a destination station such as W5 is entered, the ticket machine 109 can identify the price of the ticket 108. The passenger can accept the amount. The passenger can then pay for the ticket 108. The passenger can pay in different ways. Just like at a retail store, the passenger can be permitted to pay with cash, a credit card, or a debit card (not shown). Many other payment options such as tokens (not shown) could also be used.

The ticket machine 109 can encode the ticket 108 with certain kinds of data. For example, the ticket machine 109 can encode the ticket 108 with trip data 112 including the departure station code, e.g., A75 and the destination station code, e.g., W5. Many other kinds of data such as the time and date of purchase could also be encoded on the ticket 108.

The ticket 108 can store this data in different ways. A common way for storage on a transit ticket is a magnetic strip (not shown). Such a storage medium can be suitable for a ticket 108. Another means of storage of data can be a bar code (not shown). A bar code can be especially useful if tickets are purchased on the World Wide Web and printed on a standard printer or printed in publications such as a newspaper.

The ticketing system 100 can be set up to allow a ticket 108 to be encoded with trip data 112 including one or more destinations. For example, for a one-way ticket 108, the ticket machine 109 encodes the ticket 108 with a single destination, e.g., a code that includes designation of station W5. A ticket 108 can also be encoded with multiple destinations. Such a feature in a ticketing system 100 might be useful for a larger group of passengers leaving a departure station together in the same vehicle but going to different destinations in the same trip. The ticketing system 100 can be configured to allow passengers to enter stations A65, W1, and W5 as destination stations for one trip.

In addition, a ticket 108 can be encoded to permit multiple trips at different times. (Such a ticket 108, as discussed more fully later, can require partial cancellation of the ticket 108.) For example, for a round-trip, a passenger can enter destination W5 as the first destination. A75 can be entered by the passenger as the return trip station destination or A75 can be automatically entered as the return trip station destination because the passenger has indicated he is buying a round-trip ticket 108.

After receiving the ticket 108, the passenger can proceed to a designated berth, e.g., 107c for PRT vehicle 3. For security purposes, the station A75 can be set up to only allow passengers with tickets 108 to go to the berths 107a to 107c. For example, a passenger can be required to go through a turnstile (not shown) that screens tickets 108 (or similar security apparatus). However, the ticketing system 100 can also be configured to allow the passenger to proceed directly to the berths 107a to 107c without going through a security screening system.

Once the passenger reaches the berths 107a to 107c, the passenger can be directed to a vehicle, e.g., vehicle 3 that is ready for departure. For example, an availability light (not shown) can indicate which vehicles, 1 to 3, are available for departure. A ticket reader 113 can be positioned near the berths 107a to 107c. The ticket reader 113 can have a slot (not shown) into which the ticket 108 can be fed. The ticket reader 113 can read the encoded trip data 112 on the ticket 108.

Figure 1D:
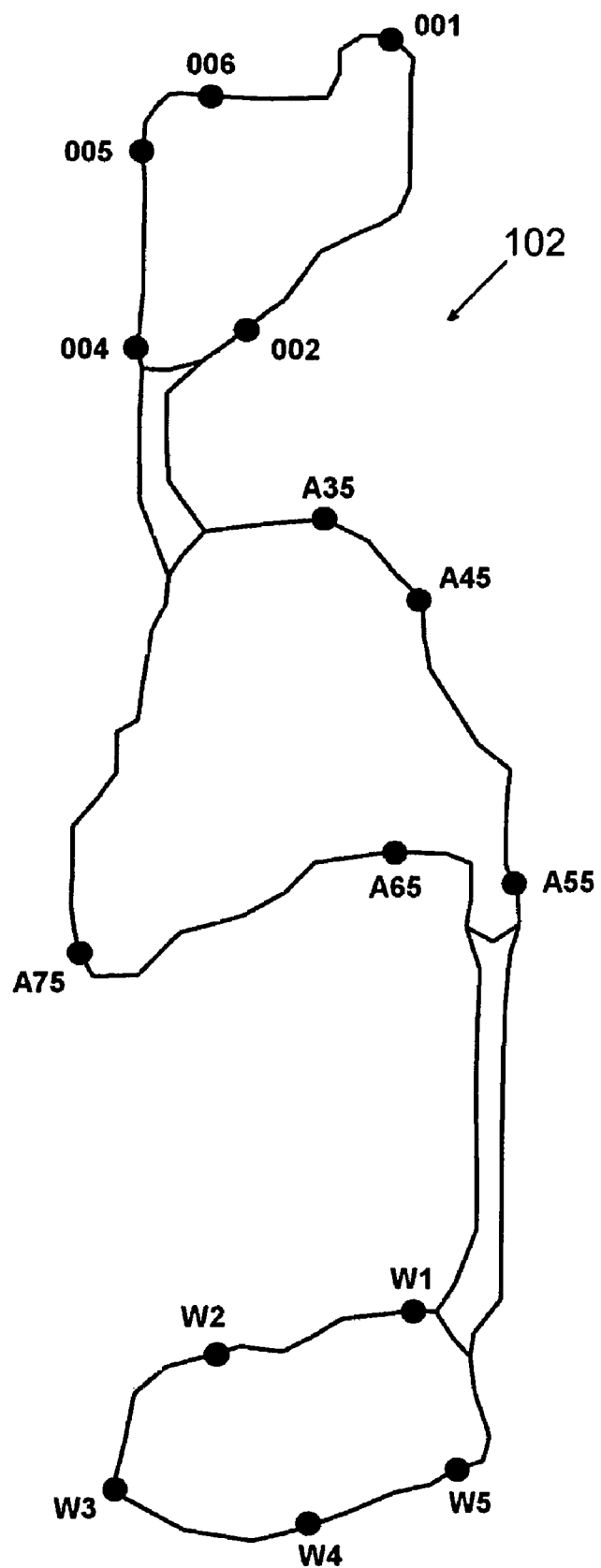
FIG. 1D is a map of a portion of personal rapid transit network according to a first embodiment.
Figure 1E:
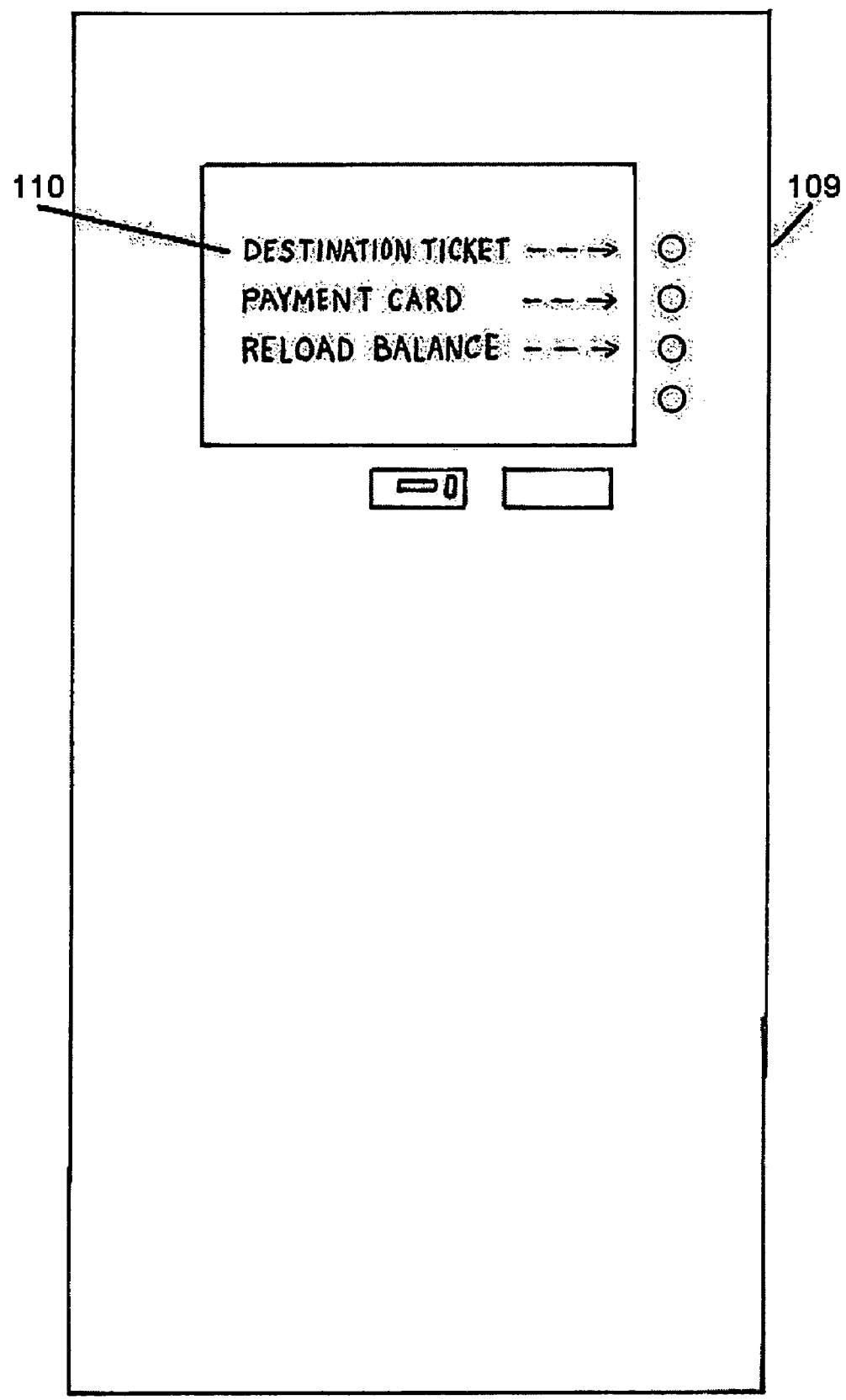
FIG. 1E is a view of a passenger interface on a ticket machine according to a first embodiment.
Figure 1F:
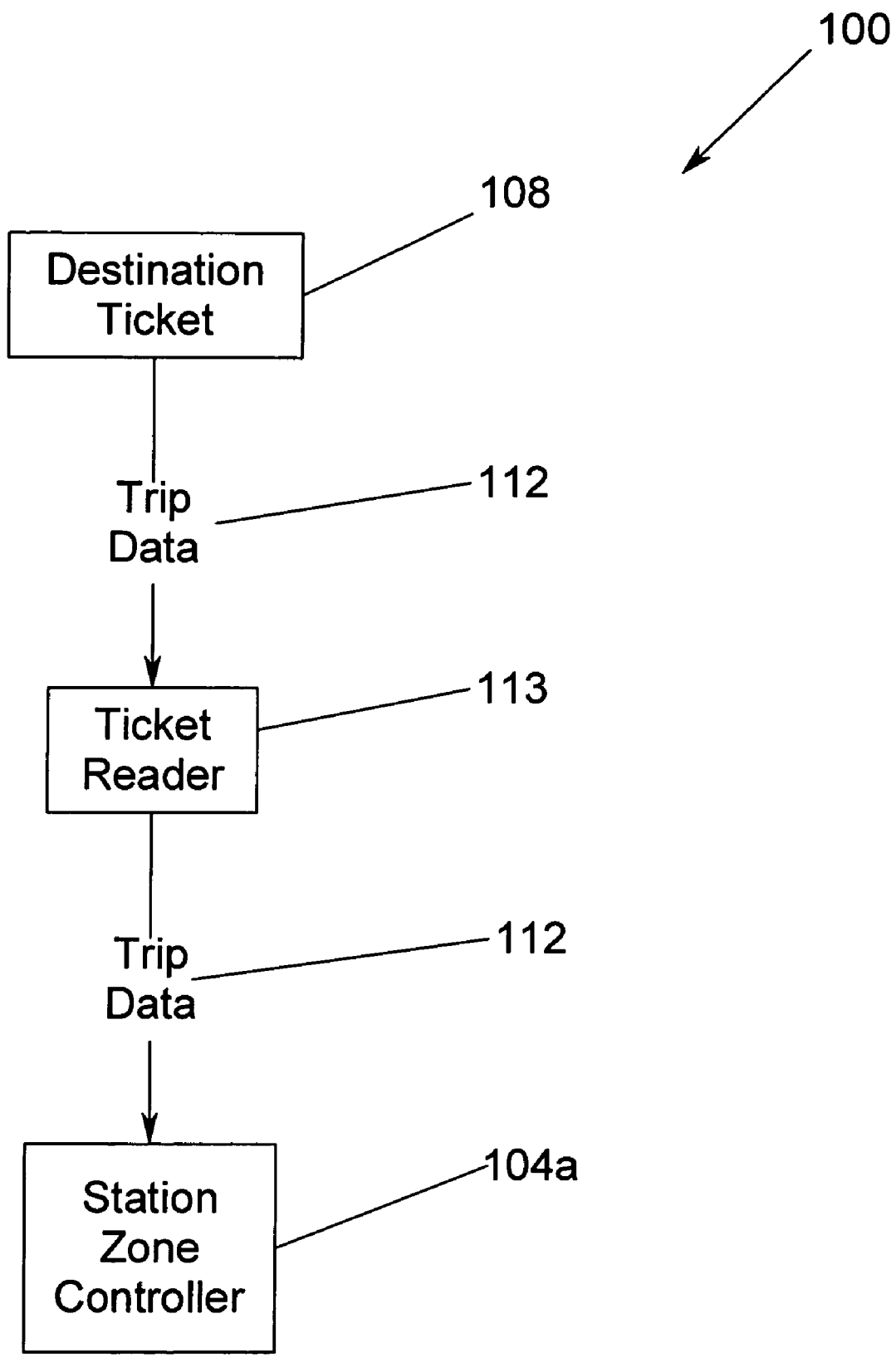
FIG. 1F is a block diagram showing a ticketing system comprising a destination ticket according to a first embodiment.

The trip data 112 encoded on the ticket 108 can be sent to the control system 101 for commanding the vehicle as shown in FIG. 1F. This can be done as follows. The ticket reader 113 can read the trip data 112 and send the trip data 112 to the control system 101. Once the ticket 108 is determined to be valid, the gate 114 to vehicle 3 can be opened to allow the passenger to enter vehicle 3. Once all the passengers have entered vehicle 3, the gate 114 can be closed. (Although not shown, the vehicle can also be equipped with a door.) Each vehicle 1 to 8 can be equipped with a "Go" button (or other means for data input) that allows the passenger to indicate the passenger or group of passengers is ready to depart. Meanwhile the trip data 112 and other relevant data such as a vehicle identifier can be communicated from the ticket reader 113 to the station controller 104a. When vehicle 3 is ready for departure, the station controller 104a can control the departure of vehicle 3 and coordinate the departure with the activities of other vehicles, 1 and 2, in the station zone 106.

The trip data 112 encoded on the ticket 108 can be sent to the control system 101 for commanding the vehicle as shown in FIG. 1F. This can be done as follows. The ticket reader 113 can read the trip data 112 and send the trip data 112 to the control system 101. Once the ticket 108 is determined to be valid, the gate 114 to vehicle 3 can be opened to allow the passenger to enter vehicle 3. Once all the passengers have entered vehicle 3, the gate 114 can be closed. (Although not shown, the vehicle can also be equipped with a door.) Each vehicle 1 to 8 can be equipped with a "Go" button (or other means for data input) that allows the passenger to indicate the passenger or group of passengers is ready to depart. Meanwhile the trip data 112 and other relevant data such as a vehicle identifier can be communicated from the ticket reader 113 to the station controller 104a. When vehicle 3 is ready for departure, the station controller 104a can control the departure of vehicle 3 and coordinate the departure with the activities of other vehicles, 1 and 2, in the station zone 106a.

Once the ticket reader 113 has read the ticket 108, the ticket 108 can be cancelled preventing further use beyond the trip for which the ticket 108 is designated. If the ticket 108 is for a round trip (or is otherwise for multiple trips at different times), the ticket 108 can be partially cancelled. For example, if the first leg of a round-trip is to W5, that portion of the trip can be cancelled. The return trip to station A75 can be cancelled upon departure on the return leg.

The ticketing system 100 can require that a ticket 108 issued by the ticket machine 109 be used within a window of time. For example, the ticketing system 100 can be programmed to require that the ticket 108 be used within 30 minutes. The time window can range from minutes to years and even have no expiration at all. However, in most instances it is preferable to have shorter expiration periods for tickets. Shorter expiration periods can allow the central control 103 to gauge demand on the network 102.

In addition, a ticket 108 can have black out periods. For example, a passenger can purchase a less expensive ticket 108 for use outside of rush hour or other times of high demand.

In the preferred embodiment, the ticketing system 100 does not specify a departure or arrival time for a vehicle or reserve a time on the network for each ticket and its associated vehicle. In fact, the overall transportation network can function more efficiently if departure and arrival times are not specified (although they can be estimated). First, it may be difficult for the passenger to be ready to depart at a given time. The passenger may wish to buy a ticket ahead of time and have the flexibility to depart within a wider window of time. Crowds at a station, e.g. A75, and traffic on the network 102 may make it difficult for a passenger to leave at a specified time. If the departure time is missed, the passenger can become frustrated and may have to get a new ticket by exchange or the purchase of a new ticket. This can be highly inconvenient for the passenger.

Second, the control system 101 for a PRT network 102 can function more efficiently if travel time on the network does not have to be reserved for a specific vehicle. A large transportation network can have a multitude of vehicles starting, continuing, and ending trips. The needs of passengers cannot be fully anticipated. The network can generally function more efficiently if the control system can adjust "on the fly" to passenger demands.

SECOND EMBODIMENT

Figure 2A:
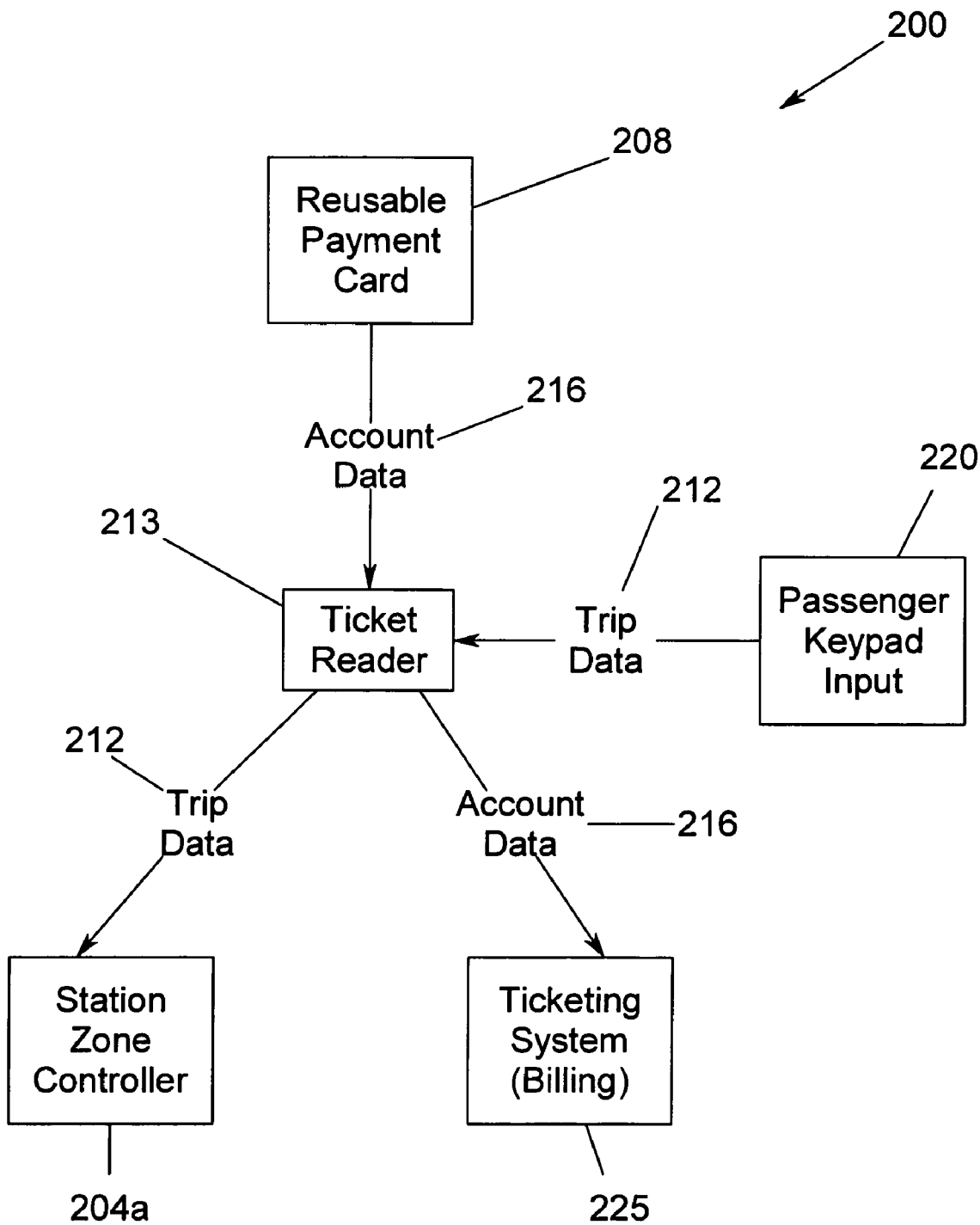
FIG. 2A is a block diagram showing a ticketing system comprising a reusable payment card according to a second embodiment.
Figure 2B:
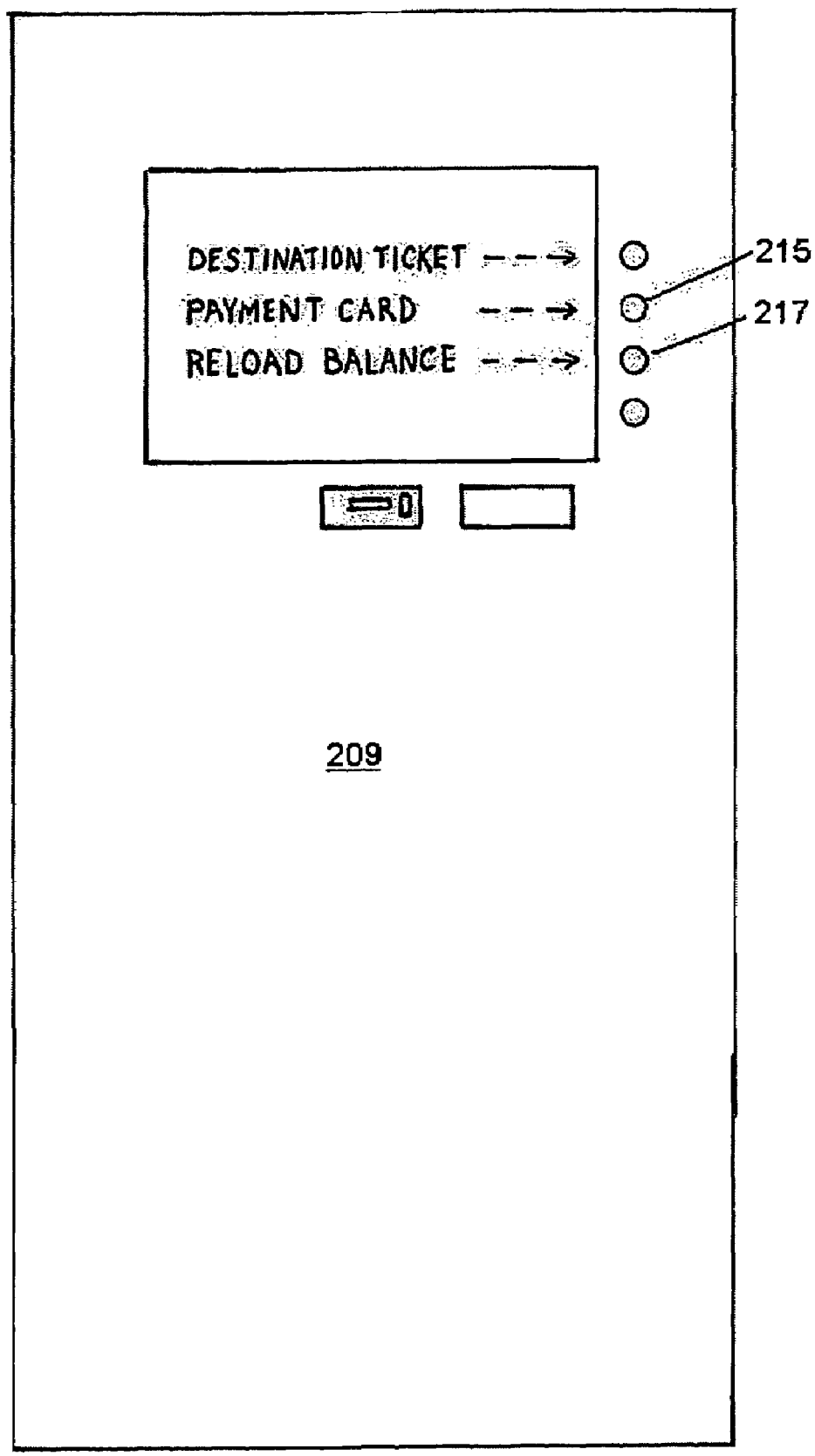
FIG. 2B is a view of a passenger interface on a ticket machine according to a second embodiment.

FIGS. 2A and 2B show a ticketing system 200 according to a second embodiment of the invention. It can generally resemble or function in conjunction with the ticketing system 100 discussed in relation to the first embodiment. As with the first embodiment, vehicles are controlled by a station zone controller 204a while in the station zone. The ticketing system 200 can have the differences or additions discussed below.

The ticketing system 200 according to the second embodiment can incorporate a reusable payment card 208. A passenger can use a reusable payment card 208 for multiple transactions with the ticketing system. The reusable payment card 208 can take many forms. The card 208 can be a debit card which bills an account by debiting a bank or other account. The card 208 can be a credit card which periodically bills an account for accumulated fares. The card 208 can be a stored value card which the holder purchases and from which fares are deducted.

Generally, a reusable payment card 208 can store or provide access to account data 216. A passenger can buy a card 208 in one transaction, create account data 216, and use that card 208 for purchasing multiple rides on the network 102 (or on other affiliated networks (not shown)). The number of rides can be limited in different ways. The rides can be temporally limited. The reusable payment card 208 might allow an unlimited number of rides within a period of twenty-four hours, a month, etc. The reusable payment card 208 might have a currency value limitation, allowing, for example, only $40 worth of rides. Alternatively, the reusable payment card 208 can have both a value and a temporal limitation.

The reusable payment card 208 can be configured in many different ways. For example, the card 208 can have a magnetic strip that stores data. Such cards are commonly used with credit cards and debit cards. The card can have an account balance encoded on the card. When the card is used, for example to purchase a trip on a transportation network, the value of that use is deducted from the account balance. (Such reusable payment cards 208 are also known as "stored value cards.") In other instances, a card with a magnetic strip can have account information encoded on it, and the balance of the account can be stored at a remote location. Oftentimes credit cards or debit cards have account information on them and store the account balance at a remote location.

The reusable payment card 208 can also be one of a variety of a "smart cards" with a "smart chip" embedded in the card. Smart cards can store data in the chip and can have read/write capabilities. The 208 card can also be a Radio Frequency ID card or tag (RFID card). RFID cards (also referred to as "contact-less smart cards") are frequently used for various security access systems such as those in office buildings and parking garages. RFID cards have an antenna for communication with an RF source. RFID cards typically store a limited amount of data such as account information. One or more than one of these or other kinds of reusable payment cards 208 can be utilized in the ticketing system 200.

The reusable payment card 208 can be used as follows. A passenger can buy a reusable payment card 208 at various locations and in various ways. The ticketing system 200 can be set up to allow a passenger to purchase one or more reusable payment cards 208 at a ticket machine 209. To purchase a reusable payment card 208 at the ticket machine 109, the passenger selects the "payment card" button 215 (or other means for data input) as shown in FIG. 1E. The passenger is prompted (not shown) to enter a payment type (e.g., credit card, debit card, bank card, or cash). For a credit or bank card, for example, the user can be prompted to enter a PIN, just like in many electronic transactions done today. The PIN can be authenticated and the amount of the purchase deducted from the account. The new reusable payment card 208 can then be issued by the ticket machine 209.

In addition, the ticket machine 209 can be set up with a "reload balance" button 217 (or other means for data input) to allow a passenger to add value to a reusable payment card 208 or to check the balance on such a card 208. Such a process can proceed in a similar way except the passenger can be prompted to insert the passenger's existing card 208, which can then be returned to the passenger once the value is added.

A passenger holding a reusable payment card 208 can bypass any ticket machine 209 and proceed directly to the ticket reader 213 and insert the card 208 into the reader 213 as depicted in FIG. 2A. This can make the reusable payment card 208 especially convenient for heavy users of the transportation network 102 such as commuters.

If the passenger with a reusable payment card 208 needs to consult a map 111 to find a destination, the passenger can consult the map at the ticket machines 209. Alternatively, the ticket reader 213 can also have a nearby map and a directory (not shown) identifying destination stations and their codes. The map and directory (not shown) can also be electronically based and can be incorporated into the ticket reader 213. Since many passengers with reusable payment cards 208 will be frequent commuters, consulting a map or a directory in many instances may be unnecessary.

Once the passenger has determined the destination, the passenger can enter the trip data 212 into the ticket reader 213 as shown in FIG. 2A. The trip data 212 can be entered in a variety of ways. A common way can be entering the data 212 with a key pad 220. For example, a destination such as W5 as shown in FIG. 1E can be keyed in using a touch screen or a keypad 220. Once this trip data 212 is keyed into the ticket reader 213, the trip data 212 can be sent to the control system 201 as shown in FIG. 2A. The account data 216 can be read on the card 208 and sent to the ticketing system 200 for billing 225. For this transaction, no physical ticket (such as a paper ticket with a magnetic strip) need be created.

THIRD EMBODIMENT

Figure 3A:
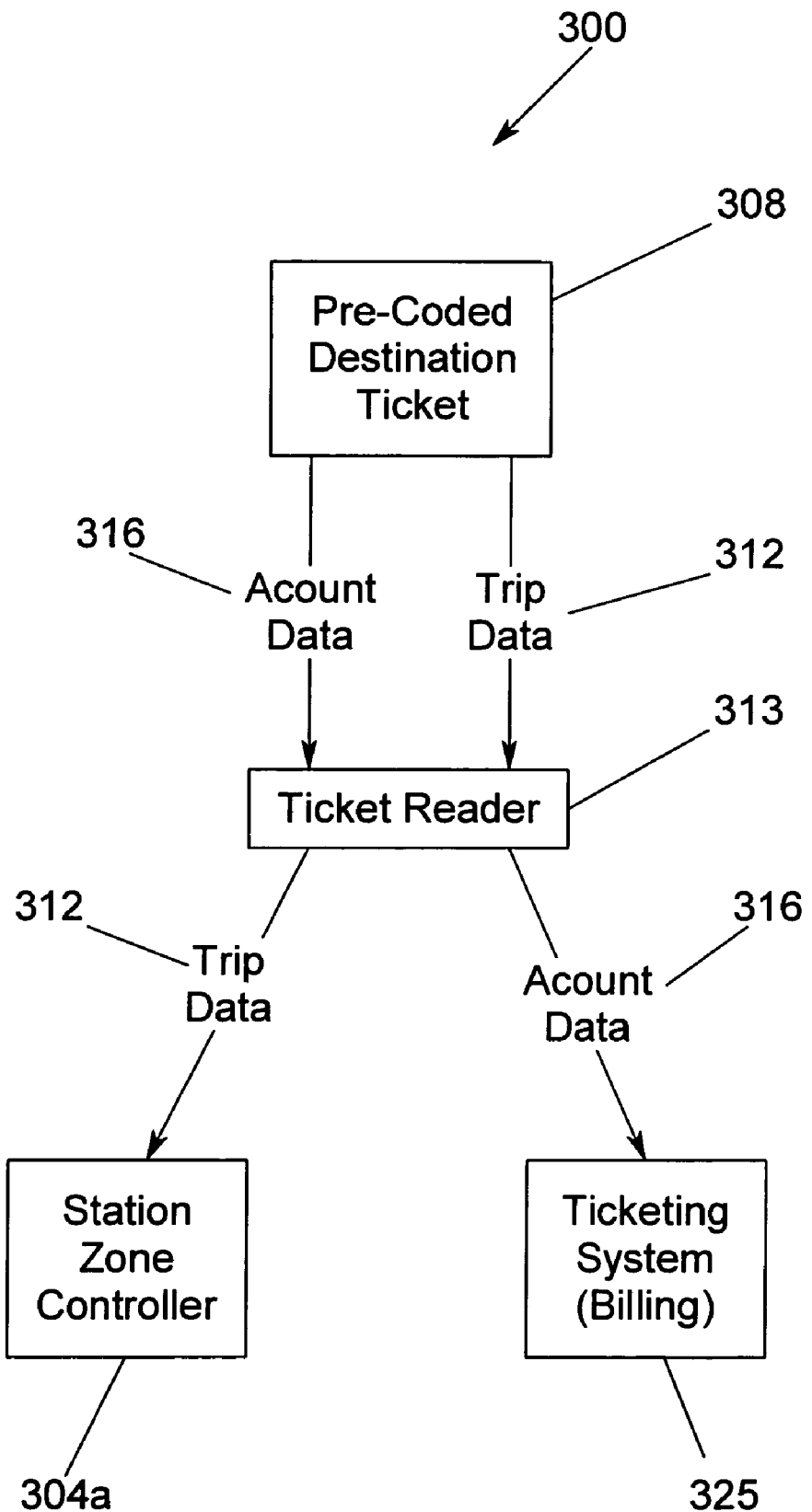
FIG. 3A is a block diagram showing a ticketing system comprising a pre coded destination ticket according to a third embodiment.

FIG. 3A shows a ticketing system 300 according to a third embodiment of the invention. It can generally resemble or function in conjunction with the ticketing system, 100, 200, discussed in relation to the first and second embodiments. As with the first embodiment, vehicles are controlled by a station zone controller 304a while in the station zone. It can have the differences or additions discussed below.

The ticketing system 300 according to the third embodiment can have pre-coded destination tickets 308. The pre-coded destination ticket 308 can work as follows. The ticket 308 can be encoded with trip data 312 such as a specific destination. For example, the ticket 308 can be encoded with a destination of W5. The ticket 308 can be given or sold to the passenger with this pre-coded trip data 312. The ticketing system 300 can prohibit any changes to the trip data 312 encoded on the ticket 308. Once the passenger has the ticket 308, the passenger can use the ticket 308 from any station (or selected stations) and proceed to a ticket reader 313. A ticket reader 313 can read the ticket 308 much as it would any other ticket, e.g., 108.

Payment for the pre-coded destination ticket 308 can occur in different ways. Payment can be made at the time of purchase of the tickets 308. For example, a commercial business such as a restaurant might buy a large quantity of pre-coded destination tickets 308 for attracting its customers to a restaurant location near a station. If payment is made at the time of purchase of the pre-coded destination tickets 308, the pre-coded destination tickets 308 can simply have trip data 312 encoded on them and omit any account information 316 on the ticket 308 for billing purposes.

Alternatively, payment can also be made after use of the pre-coded destination tickets 308. For example, once the ticket 308 has been read by a ticket reader 313, account data 316 associated with the ticket 308 can be read and sent to the ticketing system 300 for billing 325 as shown in FIG. 3A. In this instance, the pre-coded destination ticket 308 can be encoded, not just with trip data 312, but also with account data 316 that indicate which account should be billed.

Depending on the kind of ticket reader 313 used, the pre-coded destination ticket 308 can be formatted in different ways. The ticket 308 can be formatted similar to standard transit tickets such as those with a magnetic strip. Alternatively, the ticket can have a bar code that can be read by the ticket reader.

The pre-coded destination tickets 308 can be distributed in many ways—by mail, at a business location or events, or by hawkers. The ticket 308 can also be distributed as cut-out tickets in newspapers, flyers, and other publications. A ticketing system 300 with bar code capabilities can work especially well with cut-out tickets from publications or for use with tickets purchased on the Internet.

Businesses and organizations could find the pre-coded destination tickets 308 attractive for a variety of reasons. As mentioned above a restaurant might purchase pre-coded destination 308 to attract patrons to a restaurant near a station, for example, a restaurant near station W5 as shown in FIG. 1D. A hotel might distribute the tickets 308 to the guests before their arrival on an airplane, for example. After arrival at the airport, the customers can use the ticket 308 to get to the hotel just by inserting the ticket 308 into the ticket reader 313. The customer can be spared the difficulty of locating the customer's hotel and navigating a new transportation network 102.

Other features can also be added to the pre-coded destination tickets 308. For example, the ticket 308 can be partially pre-coded but can allow for additional encoding. For example, the ticket 308 can be encoded with a particular destination such as station W5. The ticket 308 can allow the encoding of a second destination. The second destination can be the beginning station on a round trip or it can be another location such as the station near a passenger's home. Such a partially pre-coded destination ticket 308 can be of value to bars, pubs, and other establishments that want to ensure that customers use the PRT instead of a motor vehicle after leaving the business.

FOURTH EMBODIMENT

A ticketing system according to the fourth embodiment (not shown) can generally resemble the ticketing system discussed in relation to the first embodiment but can have certain differences. For reference purposes only, the reference numbering from the first embodiment (FIGS. 1A-1F) will be employed in connection with the disclosure of the fourth embodiment. The ticketing system 100 according to the fourth embodiment can have the ticket machine 109 and the ticket reader 113 combined in one combined unit (not shown). The combined unit can be located in different places. It can be located near the PRT vehicle berths 107, for instance, in the same location as the ticket reader 113 discussed in relation to the first embodiment.

A ticketing system 100 with a combined ticket machine 109 and ticket reader 113 can function as follows. The purchase of a ticket 108 can generally work as it would for purchasing a ticket 108 from a stand-alone ticket machine 109 such as the one discussed above in relation to the first embodiment. A difference can be that the combined unit need not create a physical ticket 108. The required information can be entered into the combined unit located near and associated with a vehicle berth 107. Once all the required data and any payment has been made, the gate 114 to the vehicle (unnumbered) parked at the berth 107 can open and the trip can proceed as described above.

The combined ticket unit can also have the capacity to produce a physical ticket 108. For example, this may be necessary for return trips on a round-trip, for stored-value cards, etc. However, for a standard, one-way trip, the creation of a physical ticket 108 can be avoided.

In other variations, the combined ticket unit can be positioned somewhere other than next to or near a vehicle berth 107. If the combined unit were located away from the berth 107, the passenger, at the time of purchasing the ticket 108, could be assigned a berth number (i.e., berth 1 107a or berth 2 107b or berth 3 107c) for a waiting vehicle. The berth number could be printed on a ticket 108 or could be displayed on a screen (not shown) connected to the combined ticket unit. If the berth number (i.e., 107a, 107b, 107c etc.) were printed on a ticket, the ticket could also function as the means to gain entry into the vehicle once the passenger reaches the appointed berth 107.

A combined ticket unit can have advantages. It can lower the overall number of machines in a station thereby saving money. However, it can also have disadvantages. Each berth 107 may need to be equipped with a map and directory. Additional forms of security may be necessary.

MODIFICATIONS

The embodiments or examples discussed above can be combined in various ways without departing from the invention. Moreover, the present invention should not be considered limited to the particular examples described above, but rather should be understood to cover all aspects of the invention as fairly set out in the claims arising from this application. For example, while software, hardware, physical mechanisms, and the like have been disclosed in the above discussion, it should be appreciated that these are provided by way of example and not of limitation as a number of other kinds of software, hardware, physical mechanisms, and so forth may be used without departing from the invention. Various modifications as well as numerous structures to which the present invention may be applicable will be readily apparent to those of skill in the art to which the present invention is directed upon review of the present specifications. The claims which arise from this application are intended to cover such modifications and structures.

We claim:

1. A ticketing system for a transportation network comprising:
    (a) at least one ticket having trip data defining a trip that includes at least one destination within a transportation network,
    (b) a vehicle for transporting an item along the transportation network wherein the item is a human,
    (c) a ticket reader configured and arranged to electronically read trip data on the ticket and assign the vehicle to travel along a path on the transportation network in accordance with the trip data, and
    (d) a control system configured and arranged to control movement of the vehicle as the vehicle travels along the path.

2. The ticketing system of claim 1 wherein the trip data includes a plurality of destinations within a transportation network.

3. The ticketing system of claim 1 wherein the ticket is a magnetic strip card.

4. The ticketing system of claim 1 wherein the ticket is an electronic ticket residing in computer memory on a computer network.

5. The ticketing system of claim 1 wherein travel of the vehicle along the transportation network is unscheduled until the ticket reader assigns the vehicle to travel along the transportation network in accordance with trip data read from the ticket.

6. A ticketing system for a transportation network comprising:
    (a) at least one payment card having data identifying an account,
    (b) a vehicle for transporting an item along a path on a transportation network,
    (c) a control system configured and arranged to control movement of the vehicle as the vehicle travels along the path, and
    (d) a check-in system configured and arranged to electronically (i) read account data from the payment card, (ii) interface with a human to receive trip data defining a trip that includes at least one destination within the transportation network, (iii) assign the vehicle to travel along the path on the transportation network in accordance with the trip data, and (iv) charge the account for the trip.

7. The ticketing system of claim 6 wherein the item is a parcel or package.

8. The ticketing system of claim 6 wherein the item is a human.

9. The ticketing system of claim 8 wherein the trip data includes a plurality of destinations within the transportation network.

10. The ticketing system of claim 6 wherein the payment card is reusable.

11. The ticketing system of claim 9 wherein the payment card is a magnetic strip card.

12. The ticketing system of claim 6 wherein the payment card is an electronic payment card residing in computer memory on a computer network.

13. The ticketing system of claim 6 wherein travel of the vehicle along the transportation network is unscheduled until the check-in system assigns the vehicle to travel along the transportation network in accordance with trip data received by the check-in system.

14. A ticketing system for a transportation network comprising:
   (a) at least one ticket having (i) trip data defining a trip that includes at least one destination within a transportation network, and (ii) data identifying an account,
   (b) a vehicle for transporting an item along a path on the transportation network,
   (c) a control system configured and arranged to control movement of the vehicle as the vehicle travels along the path, and
   (d) a ticket reader configured and arranged to electronically read the trip data on the ticket, assign the vehicle to travel along the path on the transportation network in accordance with the trip data, and charge the account for the trip.

15. The ticketing system of claim 14 wherein the item is a parcel or package.

16. The ticketing system of claim 14 wherein the item is a human.

17. The ticketing system of claim 16 wherein the trip data includes a plurality of destinations within the transportation network.

18. The ticketing system of claim 14 wherein the ticket is a magnetic strip card.

19. The ticketing system of claim 14 wherein the ticket is an electronic ticket residing in computer memory on a computer network.

20. The ticketing system of claim 14 wherein travel of the vehicle along the transportation network is unscheduled until the ticket reader assigns the vehicle to travel along the transportation network in accordance with trip data read from the ticket.

* * * * *

UNITED STATES PATENT AND TRADEMARK OFFICE
CERTIFICATE OF CORRECTION

| | | |
|---|---|---|
| PATENT NO. | : 7,617,977 B2 | Page 1 of 1 |
| APPLICATION NO. | : 11/452184 | |
| DATED | : November 17, 2009 | |
| INVENTOR(S) | : Mathews, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Nineteenth Day of October, 2010

David J. Kappos
*Director of the United States Patent and Trademark Office*